United States Patent [19]

Tarter

[11] Patent Number: 4,618,060
[45] Date of Patent: Oct. 21, 1986

[54] FLOPPY DISC CASING WITH OPTIONAL WRITE-PROTECT CAPABILITY

[76] Inventor: Norman D. Tarter, Rte. 4, Box 456, Woodville, Miss. 39669

[21] Appl. No.: 796,080

[22] Filed: Nov. 7, 1985

[51] Int. Cl.⁴ ............... G11B 23/02; B65D 85/57
[52] U.S. Cl. ................................. 206/444; 206/459; 360/60; 360/133
[58] Field of Search ............... 206/444, 459, 387; 360/60, 133; 40/2 R, 5, 18, 491

[56] References Cited

U.S. PATENT DOCUMENTS

| | | | |
|---|---|---|---|
| 4,003,088 | 1/1977 | Schwartz | 360/60 |
| 4,053,935 | 10/1977 | Shiba | 360/60 |
| 4,291,353 | 9/1981 | Fletcher et al. | |
| 4,445,155 | 4/1984 | Takahashi et al. | |
| 4,445,157 | 4/1984 | Takahashi | |
| 4,460,930 | 7/1984 | Takahashi | 360/60 |
| 4,521,820 | 6/1985 | Fann | 360/60 |
| 4,530,017 | 7/1985 | Oishi et al. | 360/60 |
| 4,536,812 | 8/1985 | Oishi et al. | 360/60 |
| 4,549,240 | 10/1985 | Hodges | 360/60 |

Primary Examiner—William Price
Assistant Examiner—Brenda J. Ehrhardt
Attorney, Agent, or Firm—Bell, Seltzer, Park & Gibson

[57] ABSTRACT

A casing for holding a magnetic recording disc for a computer disc drive is disclosed, and which is characterized by a read-only/write-protect capability. The casing comprises an envelope having a notch formed along one folded side edge of the envelope, and a write-protect strip positioned in the folded side edge for covering the notch and thereby preventing erasure of the disc. In each disclosed embodiment, the strip includes a lip disposed within the notch for facilitating retention of the strip in the slot and sliding movement of the strip between the write-to-disc and write-protect positions. Also, the strip may include a projection portion which is sized to fit within the notch, and thereby effectively preclude inadvertent movement of the strip in the slot.

14 Claims, 29 Drawing Figures

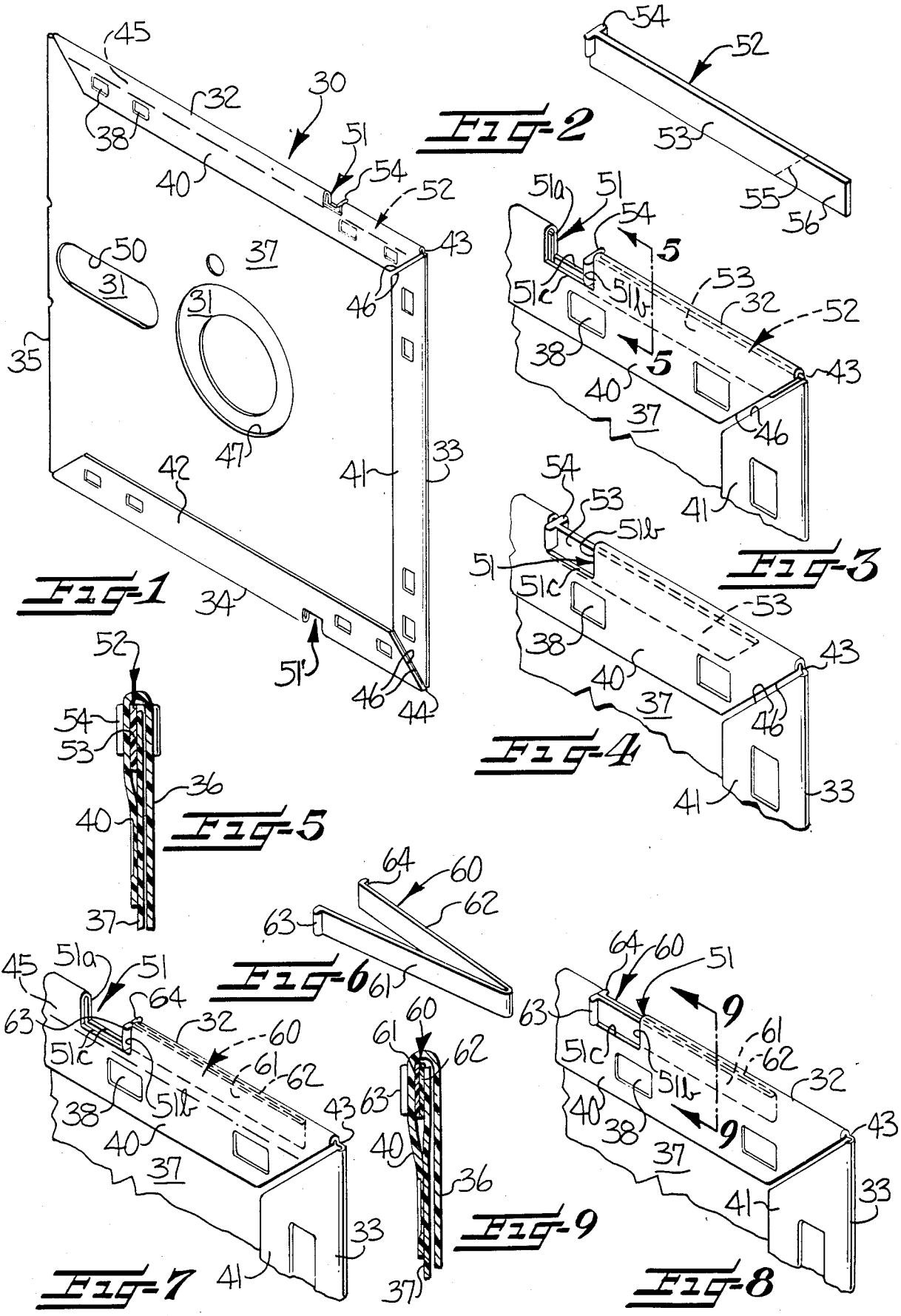

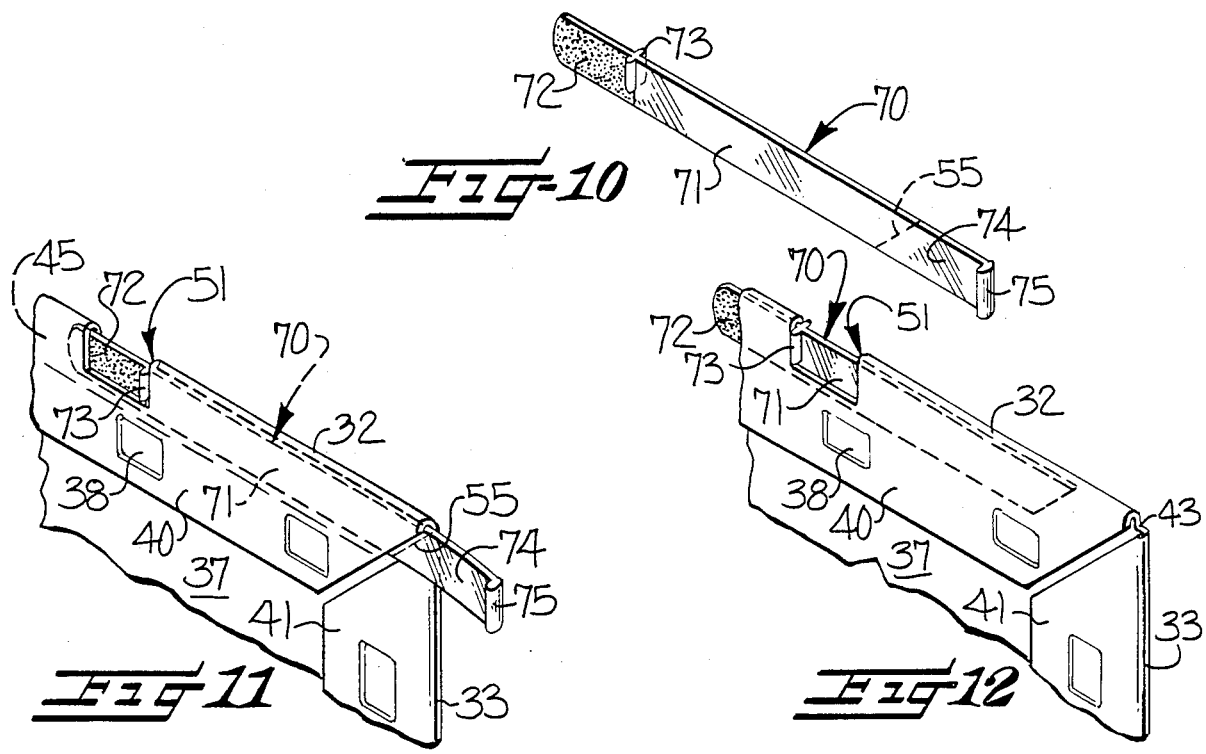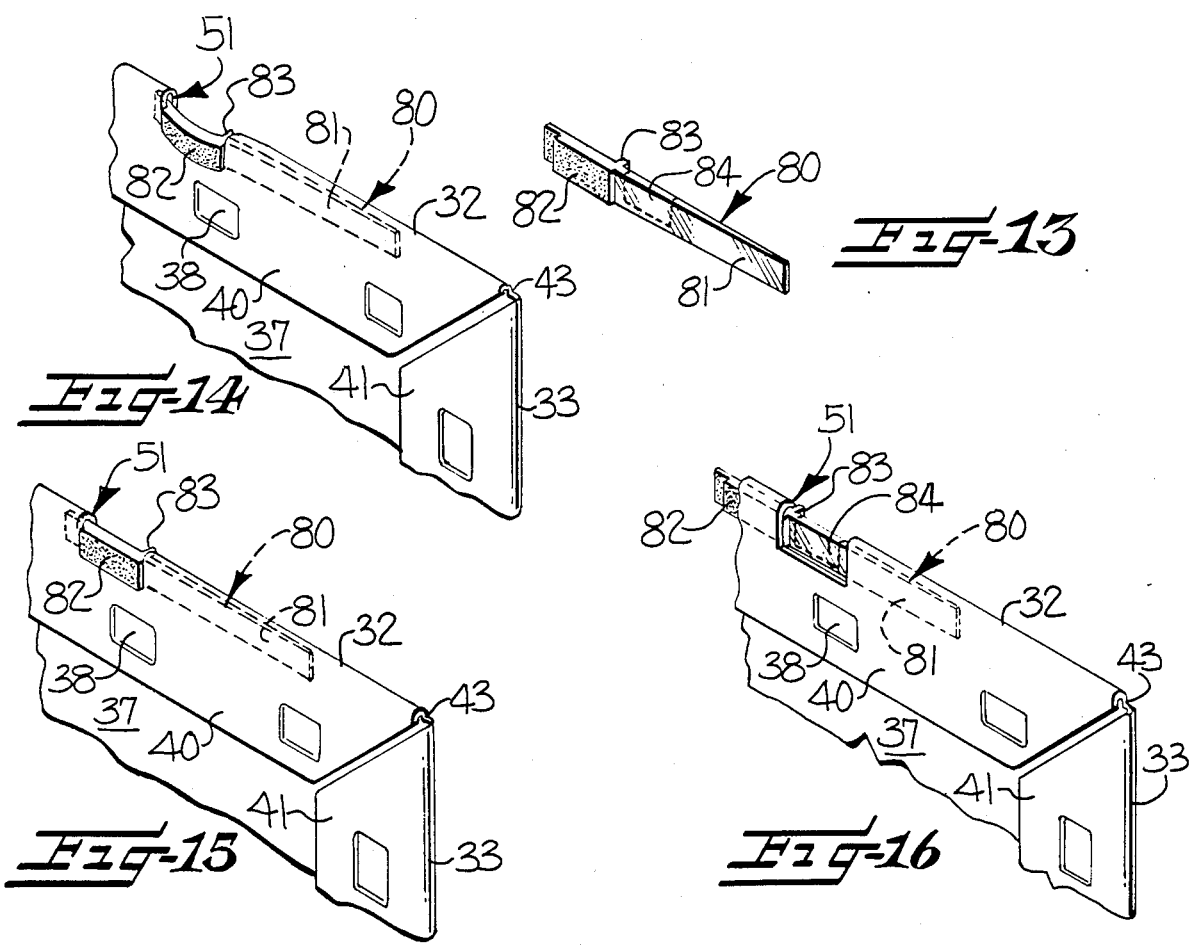

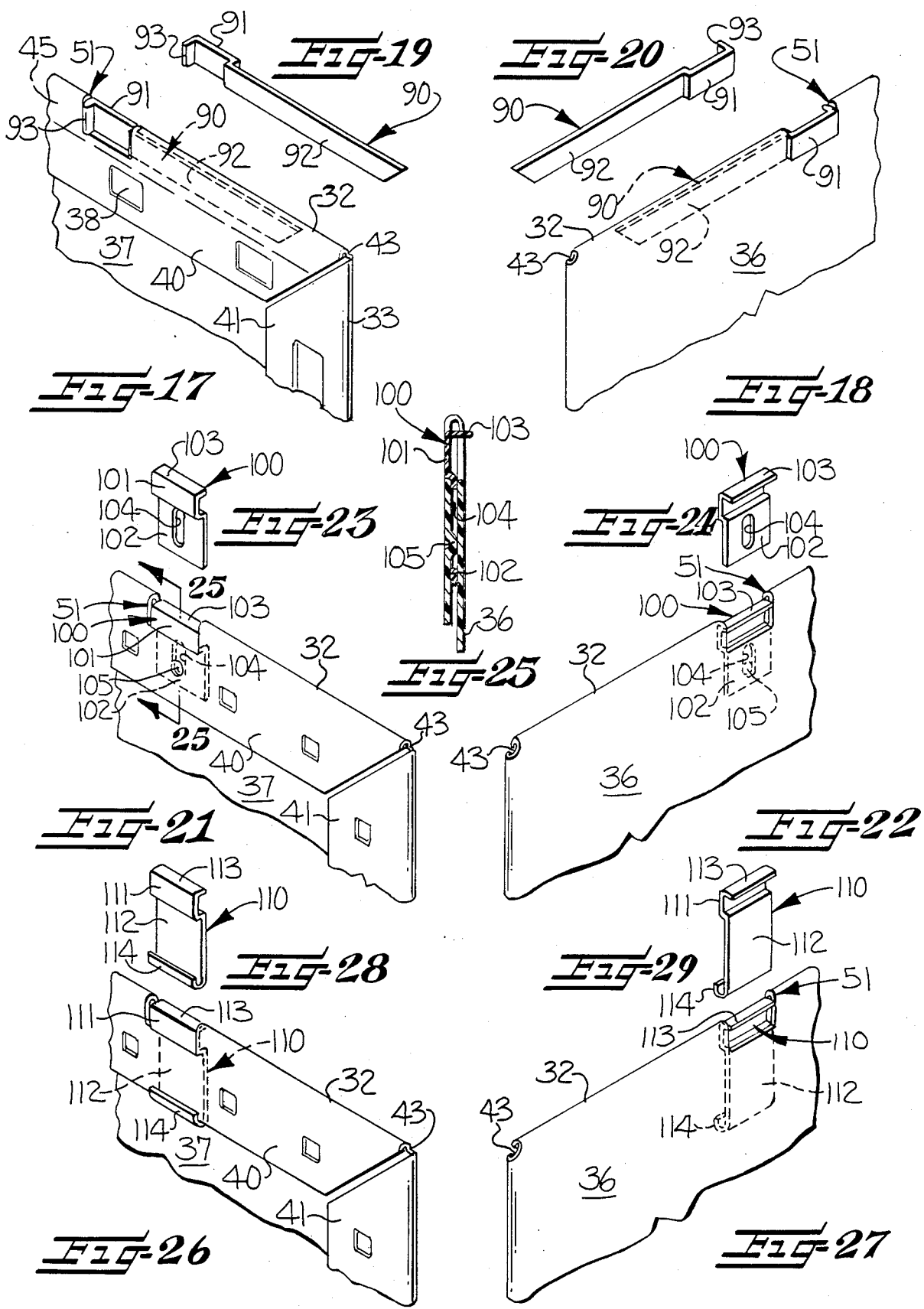

FLOPPY DISC CASING WITH OPTIONAL WRITE-PROTECT CAPABILITY

FIELD OF THE INVENTION

The present invention relates to the protective casings for magnetic discs such as those used to store or retrieve information in smaller computers, word processors, other office machines and the like; and is particularly directed towards a protective casing having an improved optional write-protect capability.

BACKGROUND OF THE INVENTION

The growth in the use of personal computers, word processors and other similar types of office equipment has resulted in a corresponding growth in the use of the magnetic disc as a means of storing information generated by, entered into, or retrieved from such equipment. These discs, generally called "floppy discs" are thin, flexible, and coated with a sensitive magnetic material. Consequently, they must be protected from direct handling by equipment operators or from contacting physical parts of the machinery other than those portions which either transfer information onto or retrieve it from such discs.

The current most common form of disc protection generally comprises a flat envelope, usually made of some sort of paper or plastic material, into which the disc is inserted. The envelope generally has several openings in it e.g., one in the center for permitting the mechanical disc drive to engage the disc, and a second opening spaced from the center through which the magnetic surface of the disc can be exposed so that the computer, word processor or other machine can read from or write to the disc.

Floppy discs most commonly are produced in two sizes, 5¼" and 8". The construction and use of both is generally very similar and often identical.

As expected in the generating, maintaining and retrieval of stored information of any type in any medium, there often exists circumstances when information stored on a floppy disc should be permanently maintained relatively secure from inadvertent erasure or when material formerly stored should desirably be erased so that the disc may be reused rather than discarded. These opposite functions are sometimes referred to as "read-only" or "write-protect" functions and "write" or "write-to-disc" functions, respectively. In either case, the object is to provide a disc upon which fresh information can be recorded and stored or a disc from which stored information can continually be retrieved but which cannot be erased or written over. As is typical of most magnetic recording mediums, recording over existing materials stored on a disc effectively erases those existing materials, whether or not erasure is intended.

For such reasons, floppy disc envelopes typically include a notch in one folded side edge of the outer envelope into which a mechanical device can fall or through which an optical signal may pass in order to either accomplish the transfer of material onto the disc or to prevent material from being transferred onto the disc. In one common embodiment, the notch allows the machine to record on the disc and when the notch is covered or absent the disc will "read only" or be "write-protected", i.e. material can be retrieved from the disc but none can be recorded onto it.

In order to use discs for both write and write-protect purposes, small pieces of special adhesive tape have commonly been used to cover the notches and thereby provide a write-protect function. Although once in place the tape provides write-protection, the tapes are messy, nonadjustable, difficult to remove, and leave an adhesive residue. Additionally, removing the tape requires more than usual handling of the fragile disc, lessening its effective life. Over longer periods of time, the adhesive properties on the tape can deteriorate so that the tapes loosen and stick to other discs in storage or loosen in the machine, thereby fouling the disc drive. Some tapes are overly sensitive to humidity and will not remain in place long enough under certain humidity conditions.

One attempted solution to this problem has been to develop a solid insert which would cover the notch in a floppy disc envelope and thereby provide a write-protect function. One recent example is given by Fann in U.S. Pat. No. 4,521,820 in which one end of a plastic strip is inserted into the notch and the other end remains exposed outside the envelope where it can be seen and grasped by an operator to effect removal. There are, however, several disadvantages to this device. First, nothing other than friction serves to hold the device permanently inserted in the envelope. Secondly, since the strip is smaller than the slot in the envelope into which it fits, nothing serves to guide the strip into the proper position in the slot. Third, the device can only be inserted from one direction, a disadvantage in certain handling applications. Finally, the device never forms a permanent part of the envelope.

It is thus an object of the present invention to provide a casing for a magnetic recording disc which includes an envelope which is characterized by a write-protect capability, and which overcomes the aforementioned disadvantages of other write-protect methods and devices.

It is a further object of this invention to provide a casing of the described type, and which includes a slideably mounted write-protect strip which is adapted to provide selective write and write-protect functions as the user wishes, and which also has provision for facilitating its sliding movement and for precluding inadvertent movement of the strip once it is in place in the envelope.

It is another object of the invention to provide a write-protect strip which can be moved to and maintained at respective write and write-protect positions defined by an interengagement between the envelope and the strip.

SUMMARY OF THE INVENTION

The above objects and advantages of the present invention are achieved in the embodiments illustrated herein by the provision of a casing for holding a magnetic recording disc for a computer disc drive which is characterized by a read-only/write-protect capability. The casing comprises a thin, substantially flat envelope of rectangular outline having four side edges. The envelope comprises front and back sheets, with portions of the front sheet folded over the back sheet along at least two adjacent side edges which define a corner. At least one of the folded portions is secured to the back sheet so as to define a slot therebetween which extends along the associated side edge. The other of the folded portions defines a fold line which extends to a location closely adjacent the corner. A notch is formed in the side edge of the envelope defined by the one folded portion and located adjacent to the corner, so that the notch communicates with the slot. A generally flat, write-protect strip is slideably positioned within the slot and has a lip extending perpendicularly therefrom which is positioned within the notch. The lip facilitates retention of the strip in the slot and sliding movement of the strip between respective write and write-protect positions, at least one of the positions being defined by placing the lip against one of the sides of the notch.

In one preferred embodiment, the strip further includes a projection portion which is laterally offset from the remainder of the strip, with the projection portion being sized to correspond to the dimensions of the notch so that removal of the projection portion from the notch is rendered difficult to thereby effectively prevent inadvertent sliding movement of the strip.

BRIEF DESCRIPTION OF THE DRAWINGS

The foregoing and other objects, advantages and features of the invention, and the manner in which the same are accomplished will become more readily apparent upon consideration of the following detailed description of the invention taken in conjunction with the accompanying drawings, which illustrate preferred and exemplary embodiments and wherein, FIG. 1 is a perspective view of one preferred embodiment of the protective casing of the present invention;

FIG. 2 is a perspective view of the write-protect strip of the present invention;

FIG. 3 is an enlarged fragmentary perspective view of one corner of the protective casing and showing the write-protect notch;

FIG. 4 corresponds to FIG. 3 but with the write-protect strip shown covering the notch;

FIG. 5 is a cross sectional view taken along line 5—5 of FIG. 3;

FIG. 6 is a perspective view second embodiment of the write-protect strip;

FIG. 7 is an enlarged fragmentary view of one corner of the protective casing and shows the second embodiment of the write-protect strip therein;

FIG. 8 corresponds to FIG. 7 and shows the second embodiment of the write-protect strip covering the notch;

FIG. 9 is a cross sectional view taken along line 9—9 of FIG. 8;

FIG. 10 is a perspective view of a third embodiment of the write-protect strip;

FIG. 11 is an enlarged fragmentary view of one corner of the protective casing and shows the write-protect strip of FIG. 9 in a write-protect position;

FIG. 12 corresponds to FIG. 11 and shows the write-protect strip in the write position;

FIG. 13 is a perspective view of a further embodiment of the write-protect strip;

FIG. 14 is an enlarged fragmentary perspective view of one corner of the protective casing and shows the manner of insertion of the write-protect strip of FIG. 13;

FIG. 15 is an enlarged fragmentary perspective view of one corner of the protective casing and shows the embodiment of the strip of FIG. 13 in write-protect position;

FIG. 16 corresponds to FIG. 15 and shows the write-protect strip of FIG. 13 in write position;

FIG. 17 is an enlarged fragmentary perspective view of one corner of the protective casing and shows the write-protect member of FIG. 19 in place in the notch;

FIG. 18 is an opposite perspective view of FIG. 17;

FIG. 19 is a perspective view of still another embodiment of the write-protect member;

FIG. 20 is an opposite perspective view of the write-protect strip of FIG. 19;

FIG. 21 is an enlarged fragmentary perspective view of one corner of the protective casing and shows a further embodiment of the write-protect strip positioned therein;

FIG. 22 is an opposite perspective view corresponding to FIG. 21;

FIG. 23 is a perspective view of another embodiment of the write-protect strip;

FIG. 24 is the opposite perspective view of the embodiment of the write-protect member as seen in FIG. 23;

FIG. 25 is a cross sectional view taken along line 24—24 of FIG. 21;

FIG. 26 is an enlarged fragmentary perspective view of one corner of the protective casing and showing a further embodiment of the write-protect strip in place;

FIG. 27 is an opposite perspective view of the corner and write-protect strip as shown in FIG. 26;

FIG. 28 is a perspective view of the write-protect strip of FIG. 26; and

FIG. 29 is an opposite perspective view of the write-protect strip of FIG. 26.

DETAILED DESCRIPTION OF THE DRAWINGS

Referring in more detail to the drawings, FIG. 1 illustrates a casing which embodies the features of the present invention, and which comprises an envelope broadly designated at 30 for holding a magnetic recording disc 31 for a computer disc drive, which casing is characterized by a write-to-disc function and an optional read-only/write-protect capability. The envelope 30 is thin, substantially flat, of rectangular outline, and has four side edges 32, 33, 34 and 35, respectively. The envelope is defined, and the edges formed, by respective front and back sheets 36 and 37, formed of suitable plastic or the like. As seen in FIG. 1, portions of the front sheet 36 are folded over the back sheet 37 along three adjacent side edges 32, 33 and 34. The respective folded portions are designated 40, 41 and 42. The side edges define corners, and in the drawings the corner defined by edges 32 and 33 is designated 43 and the corner defined by edges 33 and 34 is designated 44. The folded portions are secured to the back sheet 37 by a series of adhesively bonded segments 38, which include a heat or adhesive seal. The folded portions and the adhesively bonded segments define a respective slot 45, shown in FIG. 1 by the dashed line along side edge 32 underneath folded portion 40, between the folded portion 40 and back sheet 37. Corresponding slots are formed along folded portions 41 and 42, but for purposes of clarity these will not be further illustrated or described.

The folded portions 40, 41 and 42 further define substantially abutting end edges 46 which extend parallel to each other and parallel to a line bisecting the angle of junction of the side edges. The envelope also includes a disc drive opening 47 and a read/write opening 50. As is known to those familiar with devices in which floppy discs are used, the opening 47 allows the disc to be mechanically driven while the opening 50 provides the reading and writing electronics or "heads" with access to the disc 31 proper.

As discussed earlier, a notch broadly designated at 51 is formed in the side edge 32 of the envelope 30, with the notch 51 communicating with the slot 45 and defining opposite sides 51a, 51b, and a bottom side 51c, note FIGS. 3 and 4. In all of the embodiments of the invention, a generally flat and rectangular write-protect strip is slideably positioned within the slot 45 and has a lip extending outwardly perpendicularly from the strip within the notch 51 for facilitating sliding movement of the strip between write-to-disc and write-protect positions. At least one of these positions is defined by placing the lip against one of the sides of the notch 51.

More particularly, a first embodiment of the write-protect strip of the present invention is illustrated in FIGS. 1-5. As best seen in FIG. 2, the strip, broadly designated at 52, comprises a generally flat sheet of material, and includes an elongate rectangular strip portion 53 and a lip 54 extending perpendicularly outwardly from each side of the strip portion 53 at one end thereof. The strip 52 may be fabricated from a suitable plastic, and further includes a transverse score line 55 spaced from the end of the strip 52 nearest the corner 43. The score line 55 provides the means whereby the end portion 56 may be optionally removed from the strip 52 for purposes described below.

The particular placement of the strip 52 within the slot 45 is best illustrated in FIGS. 3 and 4. As seen therein, when the end portion 56 is removed from the strip 52 and the strip 52 is inserted into the slot 45, the strip is slideably movable between respective write-to-disc and write-protect positions. As seen in FIG. 3, because the score line 55 extends generally parallel to the line bisecting the angle of junction of the side edges 32 and 33, the portion of the strip 52 remaining after the end portion 56 has been removed can be abuttingly received against the end edge 46 of the folded portion 41. As further seen in FIG. 4, the strip 52 can be moved from the position illustrated in FIG. 3 to a position in which it totally covers the notch 51 and provides write-protection. The lip 54 is easily engageable by an operator's finger to facilitate the sliding movement between positions. Also, the lip 54 slides along the bottom side 51c of the notch, so as to facilitate guidance of the sliding strip and retention of the strip in the slot 45.

In the event the strip 52 is maintained in the configuration of FIG. 2, i.e., the end portion 56 remains attached, the strip may be inserted into the slot through the notch and so that the end portion extends outwardly beyond the end of the slot at the corner 43 to facilitate manual gripping and sliding movement thereof in the manner also illustrated in FIG. 11.

A second embodiment of the invention is broadly designated at 60, illustrated in FIGS. 6 through 9. In this embodiment, the write-protect strip 60 comprises two parallel adjacent elongate strip portions 61 and 62 which are joined at their respective ends nearest the corner 43. Each of the strip portions 61 and 62 has a respective lip portion 63 and 64 extending perpendicularly outwardly within the notch 51 at their respective opposite ends farthest from the corner 43. The lip portions 63 and 64 are laterally aligned to collectively define a lip as described above, and so as to provide the means for engaging and moving the strip 60 in a direction parallel to the slot 45 to respective write-to-disc and write-protect positions when the lip portions are adjacent one or the other of the opposite sides 51a, 51b of the notch 51. In FIG. 7, the lip portions 63 and 64 are positioned against the side 51b of the notch 51 nearest the corner 43, thereby placing the strip 60 in a write-to-disc position with the notch open. In FIG. 8, the lip portions 63 and 64 are adjacent the side 51a of the notch 51 farthest from the corner 43 in a write-protect position with the notch closed.

FIGS. 10, 11 and 12 illustrate a third embodiment of the strip at 70. By way of background, the strip 70 is designed for office machines or small computers in which the write-protect and write functions are controlled by a light source rather than by mechanical contact between the disc casing and the machine. In such circumstances, the write-to-disc and write-protect functions are determined when the notch is either transparent or opaque to the particular light source. Thus, in the embodiment of the strip 70 shown in FIG. 10 the strip has respective bordering write-to-disc and write-protect portions 71 and 72 with the write-protect portion 72 being formed of a material opaque to a write function light signal and the write-to-disc portion 71 being formed of a material transparent to the write function light signal. As in the other embodiments, the strip 70 includes a lip 73 extending perpendicularly outwardly from each side of the strip at the border between the transparent portion 71 and the opaque portion 72. As before, the lip 73 can be perpendicularly received against opposite sides of the notch 51 so that the write-protect strip 70 can be moved between and maintained at the respective write and write-protect positions.

In the embodiment illustrated in FIG. 10, the strip 70 also includes a score line 55 so that an end portion 74 may be removed from the strip 70 leaving a remaining portion which can abut the end edges 46 of the folded portions. The strip 70 also includes an enlargement 75 at the outer end of the strip, which, as shown in FIG. 11, allows the strip 70 to be moved back and forth within the slot 45 by manually engaging the enlargement 75 rather than the lip 73. In some situations, the position of the enlargement 75 will be more advantageously engaged by the hands or fingers of an operator then will the lip 73.

As further illustrated in FIGS. 11 and 12, the strip 70 can be moved back and forth between the position where the opaque portion 72 covers the notch 51 and the position where the transparent portion 71 covers the notch, thereby controlling the read and write characteristics of the disc.

A further embodiment of the invention is illustrated in FIGS. 13 through 16. This strip, broadly designated at 80, similarly comprises the transparent and opaque portions 81 and 82, respectively, with a lip 83 positioned at the border between portions 81 and 82. The write protect or opaque portion 82 also includes a projection portion which is thicker and thus laterally offset from the remainder of the strip, and the projection portion is sized to fit within the notch and thereby effectively preclude inadvertent movement of the strip in the slot when in the write protect position. Also, the strip 80 includes a break-out segment 84 in the write-to-disc portion, with the segment 84 also being sized to approximate the size of the notch. Thus the break-out segment 84 may be removed so as to adapt the casing for use when the computer disc drive includes a physical type sensing device. As shown in FIG. 14, the relatively short length of the opaque portion 82 and the flexible nature of the plastic material of the strip 80 enables the strip to be inserted into the slot 45 at the notch 51 simply by bending it slightly. As illustrated in FIGS. 15 and 16 which correspond to the similar FIGS. 11 and 12, the strip 80 can be moved to the write-protect position (FIG. 15) by moving the lip 83 against one side 51b of the notch 51 thereby placing the opaque portion 82 over the notch. Alternatively, (FIG. 16,) the lip 83 can be moved to the opposite side 51a of the notch 51 thereby placing the transparent portion 81 of the strip 80 over the notch 51. The other details of the construction of this embodiment are very similar the other embodiments already described.

Another embodiment of the invention is illustrated in FIGS. 17 through 20. In FIGS. 19 and 20, the strip is broadly designated at 90 and includes a projection portion 91. As illustrated in FIGS. 17 and 18, the projection portion 91 is laterally offset from the remainder 92 of the elongate strip and is structured for being received within the notch 51. More particularly, the projection portion 91 has respective lengthwise and widthwise dimensions substantially corresponding to the respective lengthwise and widthwise dimensions of the notch 51 so that the projection portion 91 fits rather snugly within the notch 51 making removal of the projection portion 91 from the notch 51 difficult enough to prevent inadvertent movement of the strip 90 during handling or operation of the disc. The strip further includes the lip 93 positioned on the far end of the projection portion 91 so that the strip 90 can be moved back and forth within the slot 45, while overcoming the resistance caused by the projection portion 91, to respective write and write-protect positions. It will thus be seen that although the strip 90 is movable within the slot 45, the projection portion 91 provides an additional means for securing the strip in a desired position and maintaining it there during handling.

Two somewhat different embodiments of the present invention are illustrated in FIGS. 21 through 29. In FIGS. 21 through 25, a write-protect strip broadly designated at 100 includes a projection portion 101, a remaining portion 102, and a lip 103. In this embodiment, the lip 103 extends perpendicularly outwardly from the strip 100 within the notch 51 and generally parallel to the slot 45 and side edge 32, rather than perpendicularly as in earlier embodiments. With the strip 100 and the lip 103 so positioned, the strip 100 can be engaged and moved perpendicularly to the slot 45 to a respective write-to-disc position when the lip 103 is adjacent the bottom edge 51c of the notch 51 and a respective write-protect position when the lip 103 is aligned with the associated side edge 32. As in the previously described embodiment, the projection portion 101 is of lengthwise and widthwise dimensions substantially identical to those of the notch 51 so that when the lip 103 is engaged and the strip 100 moved to the write-protect position, the projection portion 101 seats snugly in the notch 51 and is unlikely to become inadvertently moved.

The strip 100 further includes an opening 104 in the remaining portion 102, and a small glue or heat sealed segment 105 passes through the opening 104. The segment 105 assures that the strip 100 moves properly and easily between the respective write and write-protect positions because of the engagement between the segment 105 and the opening 104.

Yet another embodiment in which the strip moves perpendicularly to the side edge 32 of the envelope is illustrated in FIGS. 26 through 29 and is broadly designated at 110. As illustrated in these figures, the strip 110 includes a projection portion 111, a remaining portion 112 and a lip 113, all of which serve the identical functions as described in the immediately preceding embodiment. Additionally, however, and in place of the guide 105 and the opening 104, the strip 110 includes a lower U-shaped channel 114 of a dimension such that the bottom edge of the folded portion 40 may be received within the channel 114 (FIG. 26). It will be seen that the interengagement of the projection portion 111 with the notch 51 and the interengagement of the channel 114 with the folded portion 40 both serve to secure the strip 110 in the write-protect position, making inadvertent movement of the strip within the slot 45 difficult. By pressing downwardly on the lip 113 however, the resistance may be overcome and the the strip 110 may be moved to a write-to-disc position, wherein the lip 113 engages the bottom edge 51c of the notch 51.

Where the disc 31 is adapted to record information on both sides, it is conventional to place a second notch 51' on the side 34 of the envelope which is opposite the notch 51, note FIG. 1. Such discs, which are commonly known as "flippy discs", may be inverted and then inserted in the computer disc drive so that the notch 51' becomes operative, rather than the notch 51. With most embodiments of the present invention, the write-protect strip can be removed from the notch 51 and inserted into the opposite notch 51' to provide the desired write protect capability when the disc is so utilized.

Certain computer disc drive systems include a write-protect sensing mechanism which requires that the notch be positioned on the front side edge 35 of the envelope. This is common in the case of 8" envelopes. Most of the disclosed embodiments of the write-protect strip are useable with such envelopes, with the strip being adapted to be inserted through the notch and between the sheets 36, 37. The strip is held in such position by the friction between the sheets 36, 37 and the strip, as well as by the interengagement between the projecting lip of the strip of the sides of the notch. The present invention is also useable in association with envelopes wherein the folded portions 40, 41, and 42 are adhesively secured to the front sheet over their entire area. In such cases, the slot for the write-protect strip is formed between the two sheets 36, 37.

It will thus be seen that the present invention provides a number of embodiments, all of which are characterized by a lip which can be engaged and used to move, position and maintain a write-protect strip at respective write and write-protect positions. In particular embodiments, the strip is effectively prevented from inadvertent movement and in other embodiments, the strip comprises opaque and transparent portions appropriate for use in office machines or computers in which the write and write-protect functions are defined by a light source.

The foregoing embodiments are to be considered illustrative, rather than restrictive of the invention, and those modifications which come within the meaning and range of equivalents of the claims are to be included therein.

That which is claimed is:

1. A protective casing for holding a magnetic recording disc for a computer disc drive, and which is characterized by a write-to-disc function and an optional read-only/write-protect capability, said casing comprising, a thin, substantially flat envelope of rectangular outline and having four side edges, said envelope comprising front and back sheets and including a slot which extends along at least one of said side edges;

a notch formed in said one side edge of said envelope and communicating with said slot, with said notch defining opposite sides and a bottom side; and a generally flat write-protect strip slideably positioned within said slot and having a lip extending outwardly perpendicularly from said strip within said notch for facilitating retention of said strip in said slot and sliding movement of said strip between respective write-to-disc and write-protect positions, with at least one of said positions being defined by placing said lip against a side of said notch.

2. A protective casing according to claim 1 wherein said strip has an elongate lengthwise dimension which is disposed parallel to the direction of said slot and the associated side edge, and wherein said strip is mounted for slideable movement in opposite directions which are parallel to the direction of said slot and the associated side edge.

3. A protective casing according to claim 2 wherein said slot has an open end at one corner of said envelope, and said strip includes an end portion which extends outwardly through the open end of said slot at said corner to facilitate manual gripping thereof, and said strip further includes a score line between said end portion and the remainder of the strip for permitting the end portion to be readily separated and removed, and so that the remaining portion of the strip is wholly received in said slot.

4. A protective casing according to claim 2 wherein said strip is wholly received within said slot, and wherein said lip is adapted to engage the opposite sides of said notch in the respective write-to-disc and write protect positions.

5. A protective casing according to claim 4 wherein said lip is disposed at one end of said strip.

6. A protective casing according to claim 4 wherein said strip comprises two parallel adjacent elongate strip portions joined at one end of said strip, with each of said strip portions having a lip portion extending outwardly from said strip portion at the other end thereof, and with said lip portions being laterally aligned to collectively define said lip.

7. A protective casing according to claim 1 wherein said strip is mounted for slideable movement in opposite directions which are perpendicular to the direction of said slot and the associated side edge, and wherein said lip extends generally parallel to said associated side edge and is adapted to move between the write-to-disc position when said lip engages said bottom side of said notch and the write-protect position when said lip is aligned with the associated side edge.

8. A protective casing according to claim 1 wherein said strip includes a projection portion which is laterally offset from the remainder of the strip, said projection portion having respective lengthwise and widthwise dimensions substantially corresponding to the respective lengthwise and widthwise dimensions of said notch so that removal of said projection portion from said notch is rendered difficult so as to effectively prevent inadvertent sliding movement of said strip during handling or use of said casing.

9. A protective casing according to claim 1 wherein said strip includes bordering write-to-disc and write-protect portions, and with said lip being positioned between said write-to-disc and write-protect portions.

10. A protective casing according to claim 9 wherein said write-protect portion is formed of a material opaque to a write function light signal and said write-to-disc portion is formed of a material transparent to a write function light signal.

11. A protective casing according to claim 10 wherein said write-protect portion includes a projection portion which is offset laterally from the remainder of the strip, with said projection portion being sized to fit within said notch and thereby effectively preclude inadvertent movement of the strip in the slot.

12. A protective casing according to claim 11 wherein said write-to-disc portion includes a break-out segment which is sized to correspond to the size of said notch, and such that the break-out segment may be removed so as to adapt the casing for use when the computer disc drive includes a physical type sensing device.

13. A protective casing for holding a magnetic recording disc for a computer disc drive, and which is characterized by a write-to-disc function and an optional read-only/write-protect capability, said casing comprising, a thin, substantially flat envelope of rectangular outline and having four side edges, said envelope comprising front and back sheets, with portions of said front sheet folded over said back sheet along at least two adjacent side edges which define a corner therebetween, and with at least one of said folded portions being secured to said back sheet so as to define a slot therebetween which extends along the associated side edge, and with the other of said folded portions defining a fold line which extends to a location closely adjacent said corner;

a notch formed in the side edge of said envelope defined by said one folded portion and located adjacent said corner, and with said notch communicating with said slot and defining opposite sides and a bottom side; and a generally flat elongate write-protect strip slideably positioned within said slot, said strip having a length not greater than the distance between said fold line and the side of said notch nearest said fold line, and said strip having a lip positioned thereon at the end adjacent said notch, said lip extending outwardly perpendicularly from said strip for selectively engaging said opposite sides of said notch whereby the write-protect strip may be moved between and maintained at a write-to-disc position defined by placing said lip against the side of said notch nearest said fold line and a write-protect position defined by placing said lip against the side of said notch farthest from said fold line.

14. A protective casing for holding a magnetic recording disc for a computer disc drive of the type using a light signal to identify write and write-protect functions, and which casing is characterized by a write-to-disc function and an optional read-only/write-protect capability, said casing comprising, a thin, substantially flat envelope of rectangular outline and having four side edges, said envelope comprising front and back sheets, with portions of said front sheet folded over said back sheet along at least two adjacent side edges which define a corner therebetween, and with at least one of said folded portions being secured to said back sheet so as to define a slot therebetween which extends along the associated side edge;

a notch formed in the side edge of said envelope defined by said one folded portion and located adjacent said corner, and with said notch communicating with said slot and defining opposite sides and a bottom side; and a generally flat elongate write-protect strip positioned within said slot, said strip having respective bordering write-to-disc and write-protect portions, said write-protect portion being formed of a material opaque to a write-function light signal and said write-to-disc portion being formed of a material transparent to a write-function light signal, and said strip having a lip extending outwardly perpendicularly from said strip at the border between said write-to-disc and write-protect portions, with said lip being positioned within said notch and adapted for engaging opposite sides of said notch whereby the write-protect member may be moved between and maintained at respective write and write-protect positions each defined by placing said lip against respective opposite sides of said notch.

* * * * *